US 6,677,048 B2

(12) United States Patent
Karhuketo et al.

(10) Patent No.: US 6,677,048 B2
(45) Date of Patent: *Jan. 13, 2004

(54) FOODSTUFF PACKAGE COVERSTRUCTURE

(75) Inventors: Hannu Karhuketo, Valkeakoski (FI); Heikki Korpela, Valkeakoski (FI)

(73) Assignee: UPM-Kymmene Corporation, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/765,956

(22) Filed: Jan. 18, 2001

(65) Prior Publication Data

US 2001/0026874 A1 Oct. 4, 2001

Related U.S. Application Data

(63) Continuation of application No. PCT/FI99/00577, filed on Jun. 30, 1999.

(30) Foreign Application Priority Data

Jul. 20, 1998 (FI) .................................................. 981644

(51) Int. Cl.⁷ .......................... B32B 27/08; B32B 27/10; B32B 27/34; B32B 27/36
(52) U.S. Cl. .................. 428/475.2; 428/34.2; 428/35.7; 428/36.6; 428/479.3; 428/479.6; 428/480; 428/481; 428/532; 428/537.5; 428/346; 428/347; 428/349
(58) Field of Search ................................ 428/34.2, 35.7, 428/36.6, 480, 346, 347, 349, 481, 475.2, 479.3, 479.6, 532, 537.5

(56) References Cited

U.S. PATENT DOCUMENTS

| | | | | |
|---|---|---|---|---|
| 5,258,422 A | * | 11/1993 | Chang et al. | 523/124 |
| 5,314,969 A | * | 5/1994 | Imaizumi et al. | 525/437 |
| 5,458,933 A | * | 10/1995 | Suskind | 206/812 |
| 5,849,374 A | * | 12/1998 | Gruber et al. | 428/212 |
| 5,916,615 A | * | 6/1999 | Brady et al. | 206/557 |
| 6,025,028 A | * | 2/2000 | Asrar et al. | 427/358 |
| 6,080,478 A | * | 6/2000 | Karhuketo | 156/244.11 |
| 6,153,276 A | * | 11/2000 | Oya et al. | 383/109 |
| 6,322,899 B1 | * | 11/2001 | Karhuketo et al. | 428/475.2 |

* cited by examiner

*Primary Examiner*—Vivian Chen
(74) *Attorney, Agent, or Firm*—Fitch, Even, Tabin & Flannery

(57) ABSTRACT

The lid structure for a food packaging container comprises a paper-based body layer and, on the side that is to be against the packaging container, plastic layers that function as a barrier and as heat-sealable layers. The lid structure comprises, as the plastic layers attached to the body layer, one or more layers of biodegradable plastic, such as polylactide and/or polyhydroxy alkanoate and on their outer side, the outermost layer, which is formed of biodegradable ester copolymer, to whose ester parts a comonomer has been linked by ester or amide bonds.

9 Claims, 2 Drawing Sheets

FOODSTUFF PACKAGE COVERSTRUCTURE

This is a continuation, of prior application number PCT/FI99/00577 filed Jun. 30, 1999 and designating the U.S., which is hereby incorporated herein by reference in its entirety.

The object of the invention is a lid structure for a food packaging container, which lid structure is of the type presented in the preamble of the attached claim 1.

There are several known lid structures used for closing food packaging containers, which lid structures are paper-based and comprise several layers of plastic on their lower surface. This kind of laminate structure is sealed fast to the edge flange of the packaging container that is intended as the actual storage space for the food. The lid must be, on the one hand, capable of being attached fast to the packaging container and, on the other hand, it must be easily detachable, in such a way that it can most preferably be pulled off completely from the packaging container, i.e. good peelability.

The lid structure, which is a paper-based laminate, has been presented, for example, in the international publication WO 95/10413. What is presented here is a gas barrier layer on the lower surface of the paper layer, attached to the paper by means of a sealing layer, which gas barrier layer may, for example, be of polyamide, and under it, a peelable layer that is heat-sealable to the packaging container, attached again to the gas barrier layer by means of a sealing layer.

Other paper-based laminates comprising various plastic layers, which laminates can be used as lid structures that are heat-sealable to the packaging container, are presented in the EP patent 258527, EP published application 322189 and U.S. Pat. 4469258.

Paper-based laminates are intended to replace packaging laminates comprising an aluminium film, which are troublesome in terms of recyclability. Recently more attention has been paid than before to the recyclability of packaging materials. The aim is, for example, to sort wastes, in which case plastic and paper, for example, should be separated from each other In packaging laminates, the various components are difficult to separate from each other. Therefore, efforts have been made to use compostable materials, i.e. biodegradable materials, where decomposition is caused by the action of micro-organisms starting in suitable conditions Many biodegradable packaging materials are known, in which the aim is to achieve a suitable sandwich structure as regards biodegradability, on the one hand, and the gas and water vapour barrier properties required of a food packaging container on the other In order to meet these requirements, several biodegradable plastics have been developed which can be used in the plastic layers of paper-based packaging laminates. Until recently, the scope of application has been liquid packaging containers and flexible packaging papers used in bag-like packages. Until now it has not been possible to apply the above-mentioned idea to lids which are stripped off intact, i.e. which are peelable.

The aim of the invention is to eliminate the above-mentioned disadvantages and to provide a lid structure which, on the one hand, acts as a barrier according to the requirements for food products, is biodegradable and, in addition, can be stripped off intact from the packaging container, i.e. is peelable. In this connection peelability refers to the fact that the body material of the lid, i.e. paper, and, on the other hand, one or more plastic layers remain attached to the lid, while the lowest plastic layer may remain fast to the edge at the packaging container edges. To achieve this aim, the main characteristic of the lid structure relating to the invention is what has been presented in the characterising part of the attached claim 1.

The lid is a paper-based laminate made, for example, of paper or paperboard, under which there is one or more layers of biodegradable plastic, such as polylactide and/or polyhydroxy alkanoate, together with layers that may be of some other biodegradable plastic. The outermost, i.e. the lowest layer when the packaging container is in the position for use, which layer is attached to the packaging container, is a biodegradable copolymer (ester copolymer) containing ester bonds, to the ester parts of which copolymer a comonomer has been linked by ester or amide bonds. This outermost layer provides peelability.

Peeling occurs so that the peelable boundary layer is between the layer of biodegradable ester copolymer and the layer on its inner side, in which case, when the lid is removed, this outermost layer remains fast to the edge of the packaging container and the part of this layer which is in the middle of the packaging container comes off together with the lid.

Alternatively, the lower surface of the lid can be formed of material whose outer surface forms a peelable boundary layer, such as styrene lacquer.

Polylactides and polyhydroxy alkanoates, such as hydroxybutyrate/hydroxyvalerate copolymer are known biodegradable plastics. The thin outermost layer of ester copolymer is also biodegradable, which means that the entire lid is compostable. When styrene lacquer is used as the lower surface of the lid, the amount used is so small that it does not impair compostability.

BRIEF DESCRIPTION OF THE DRAWINGS

In the following, the invention is described in more detail with reference to the accompanying drawings, in which

FIG. 1 shows a lid L relating to the invention, which lid has been heat-sealed to a cup-like or dish-like packaging container P. The lid comprises a paper-based body layer 1, on the surface of which there may be coating layers, for example for printing. On the lower side of the paper, i.e. towards the packaging container P, there is at least one layer 2 of biodegradable plastic. Furthest out, i.e. nearest the packaging container P there is a layer 3 sealed fast to the edge P1 of the packaging container which edge projects outwards, which layer 3 enables peelability of the lid. The edge P1 is a flange-like part that in a manner known as such surrounds the central aperture covered by the lid, onto the upper surface of which part the lid L is sealed tightly. The lid L can be sealed onto the packaging container by heat-sealing the layer 3 onto the edge P1 by means of temperature and pressure.

Layer 2, which borders on the body layer is of polylactide or polyhydroxy alkanoate, the latter possibly being polyhydroxy butyrate (PHB), hydroxybutyrate/hydroxyvalerate copolymer (HB/HV) or another polyhydroxy alkanoate, such as hydroxybutyrate/hydroxyhexanoate copolymer. The thickness of this layer may be 10–30 g/m$^2$.

The heat-sealable and peelable layer is of ester copolymer, whose polymer chain characteristically has ester segments formed by a diole and bifunctional carboxylic acid (dicarboxylic acid), and a comonomer linked to the chain in polymerisation, which comonomer can form amide segments or ester segments in the polymer chain, in which case this comonomer is an amine or, correspondingly, a bifunctional carboxylic acid or their analogue.

The ester copolymer may be a biodegradable polyester amide, which comprises successive aliphatic ester and amide segments. This polyester amide is statically built up as successive ester and amide segments. An example of an aliphatic polyester amide is a polymer which contains ester chains formed by adipic acid and butane diole and amide chains formed by aminocaproic acid, which chains are linked to each other by amide and ester bonds. Polyester amide can be worked when molten into thin films by means, for example, of extrusion or coextrusion. The melting point of the polymer is 90° C., most generally above 100° C. (ISO 3146/C2). The polymer is sold by Bayer AG under the trade name BAK 1095 and it has been described in a European published application 641817 (Bayer AG), to which U.S. Pat. 5,644,020 corresponds.

The ester copolymer may also be a biodegradable aliphatic-aromatic copolyester, which is comprised of statically aromatic bifunctional carboxylic acid, such as terephtalic acid or its derivative, of aliphatic bifunctional carboxylic acid, such as adipic acid, and of diole. Like polyester amide, the polymer can be worked when molten and its melting point (DSC) is above 90° C., most generally above 100° C., and it can be worked in the same way as polyolefin, for example in the temperature range of 100 . . . 200° C. Like polyester amide, aliphatic-aromatic copolyester is suitable for spreading by extrusion or coextrusion.

Aliphatic-aromatic polyesters are described in international publications WO 96/15173 and WO 98/12242 (BASF AG).

Figure 1:
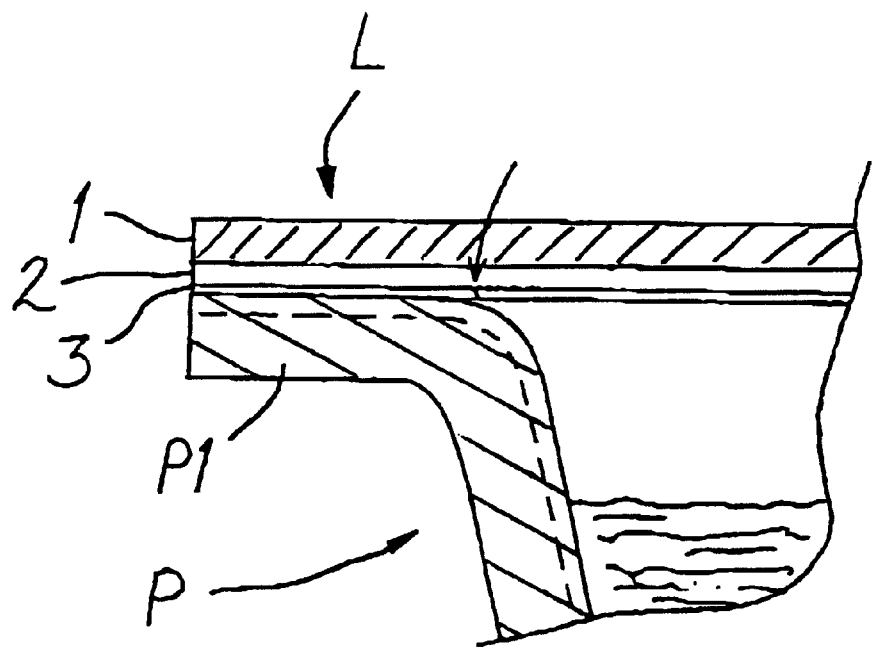
FIG. 1 shows a section of one embodiment relating to the invention.

The peeling of the lid in FIG. 1 occurs by delamination, i.e. the lid tears at the edge of the packaging container P at the boundary layer between the outermost layer 3 and the layer which is towards the paper layer. Layer 3 remains attached to the edge of the packaging container, and layer 3 breaks between the open middle section and the edge of the packaging container, and layer 3 remains attached to the lid in the area of the middle section. In FIG. 1 this point is marked with an arrow and a transverse line.

The maximum thickness of the outermost layer 3 is 5 g/m², typically 1–4 g/m², i.e. its quantity/thickness is distinctly less than the quantity/thickness of the only plastic layer or the total quantity/thickness of several plastic layers.

Figure 2:
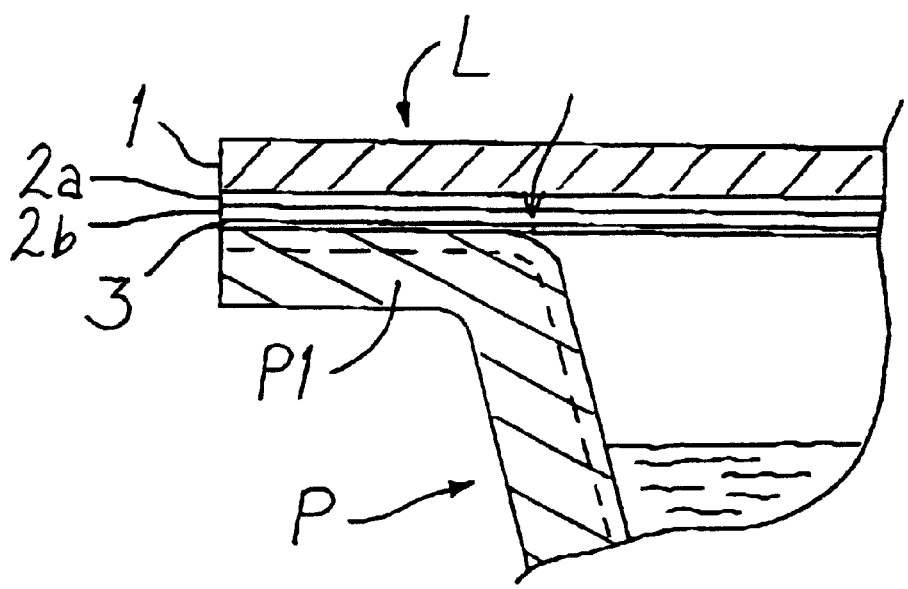
FIG. 2 shows a section of another structure relating to the invention.

FIG. 2 shows another alternative, the function and structure of which are the same, with the exception that there are two biodegradable plastic layers 2a and 2b, which have been chosen for their barrier and adhesion properties, between the outermost layer 3 of the ester copolymer and the body layer 1. The inner layer 2a may be of one of the polyhydroxy alkanoates mentioned above and the outer layer 2b of polylactide, or the layers can be placed the other way around Particularly advantageous is the alternative where the polyhydroxy alkanoate is the inner layer 2a that borders on the body layer 1, and the polylactide is the outer layer 2b that borders on the layer 3 of ester copolymer, since polyhydroxy alkanoate has good adhesion to paper and polylactide and the latter has suitable adhesion to ester copolymer.

Figure 3:
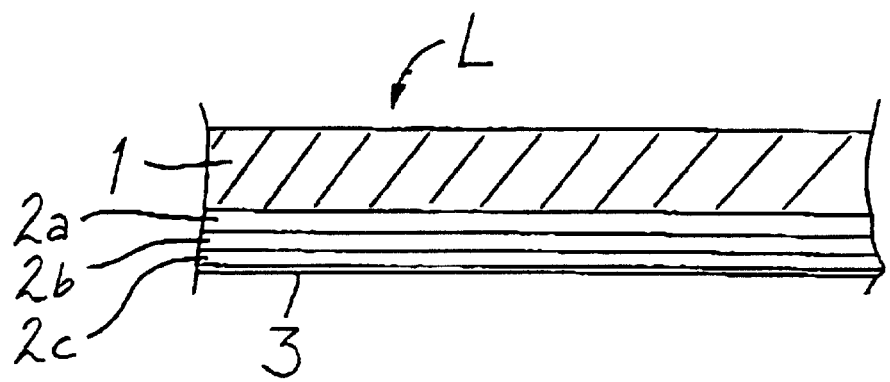
FIGS. 3 and 4 show other possible structure alternatives for the lid.

FIG. 3 shows a third structure, in which there are three biodegradable plastic layers 2a, 2b, 2c between the outermost layer 3 and the body layer. The middle layer 2b may be of one of the polyhydroxy alkanoates mentioned above and the layers 2a, 2c on either side of layer 2b may be of polylactide, or the middle layer may be of polylactide and the layers on either side of it of polyhydroxy alkanoate. The alternative where the outermost middle layer 2c is of polylactide, is advantageous, since as regards peelability it has suitable adhesion to the outermost layer 3 of ester copolymer.

Figure 4:
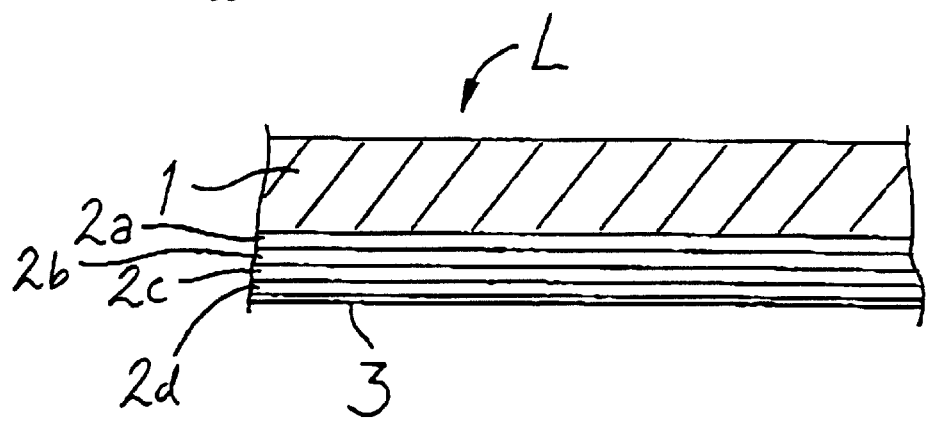

FIG. 4 shows a fourth possible structure, in which there are four biodegradable plastic layers 2a, 2b, 2c, 2d between the body layer 1 and the outermost layer 3. Here layers made of polylactide and of one of the above-mentioned polyhydroxy alkanoates can alternate in such a way that layer 2a bordering on the body layer 1 is made of one of the above-mentioned polyhydroxy alkanoates, in which case layer 2d bordering on the outermost layer 3 is correspondingly of polylactide, or the polylactide may be closest to the body layer, in which case layer 2d bordering on the outermost layer 3 is correspondingly of one of the above-mentioned polyhydroxy alkanoates. As regards peelability, the preferred alternative is that where layer 2d bordering on the outermost layer 3 is polylactide.

There may also be more biodegradable plastic layers between the body layer 1 and the outermost layer 3

In the case that there are two polyhydroxy alkanoate layers in the laminate, their compositions can be different, i.e. they can be polyhydroxy alkanoates of different chemical structures. Likewise, the various polylactide layers can be of different grades of polylactide.

The lid is completely biodegradable in composting conditions. The biodegradability of the various plastic layers refers to the breaking up, by the action of microbial activity in the compost, of the polymer chain of their basic polymer into small-molecular compounds, particularly into carbon dioxide. However, on the lower surface of the lid L, comprising the paper body layer 1 and one or more layers of biodegradable plastic, it is possible to use some known substance used in peelable lids, which substance is not known to possess biodegradable properties and which remains completely fast to the lid when removing the lid L. The amount of such substances is small, the maximum preferably being 5 g/M²₇ for example 1–4 g/m², and styrene lacquer can be mentioned as an example. An example of this is the structure in FIG. 1, in which there is a layer 2 of polylactide (approximately 10–30 g/m²) and, as the outermost layer 3, styrene lacquer (approximately 1–4 g/m²).

The packaging container P, which is open at the top and which is closed with a lid after the packaging container has been filled, is also preferably biodegradable. For example, it may comprise a paper-based body, on the surface of which there is a biodegradable plastic of the kind to which layer 3 can easily be heat-sealed, for example polylactide or polyhydroxy alkanoate, and this kind of sandwich structure has been illustrated by broken lines in FIGS. 1 and 2. The packaging container P may also be completely formed of biodegradable plastic or laminates thereof, for example, it can be completely formed of polylactide. The packaging container may be a cup-like packaging container containing drinks, dairy products or solid foods, or another type of packaging container containing foodstuffs.

As mentioned above, the body layer 1 is of suitable paper-based material, such as paper or paperboard, which are also biodegradable. The body layer functions as the support layer, and its purpose is to form a suitable surface for printing. The grammage and thickness of the body layer are usually higher than the total grammage and thickness of the plastic layers beneath it.

Small amounts of another polymer not affecting biodegradability may be compounded in the layers, such as another biodegradable polymer, as well as additives known in plastics technology mainly used to improve processability, The lid structure can be produced by means of coextrusion, in which case films formed of biodegradable plastic in a molten form are applied to the surface of the body layer 1, after which lids L of the correct size and shape can be formed of the laminate material by means, for example, of die-cutting.

What is claimed is:

1. A lid structure for a food packaging container, comprising a paper-based body layer and, on a side that is against the packaging container, plastic layers that function as a barrier and as heat-sealable layers, wherein the plastic layers comprise, as the plastic layers that are attached to the body layer, one or more layers of biodegradable plastic selected from the group consisting of polylactide, polyhydroxy alkanoate, and a mixture thereof, and on their outer side an outermost layer which is formed of biodegradable ester copolymer, to whose ester parts a comonomer has been linked by ester or amino bonds, wherein the biodegradable ester copolymer is a biodegradable polyester amide.

2. A lid structure as claimed in claim 1, wherein there is a peelable boundary layer between the layer of ester copolymer and the layer on its inner side.

3. A lid structure as claimed in claim 1 or 2, wherein the biodegradable ester copolymer is an aliphatic-aromatic copolyester.

4. A lid structure as claimed in claim 3, wherein inside the outermost layer, forming the layer that borders thereon, there is a layer of polylactide.

5. A lid structure as claimed in claim 3, where the lid comprises one or more layers of polyhydroxy alkanoate and one or more layers of polylactide.

6. A lid structure as claimed in claim 1 or 2, wherein inside the outermost layer, forming the layer that borders thereon, there is a layer of polylactide.

7. A lid structure as claimed in claim 6, wherein the lid is produced by coextrusion.

8. A lid structure as claimed in claim 1 or 2, wherein the lid comprises one or more layers of polyhydroxy alkanoate and one or more layers of polylactide.

9. A lid structure as claimed in claim 8, wherein the lid is produced by coextrusion.

* * * * *